United States Patent
Wang et al.

(10) Patent No.: US 12,405,219 B2
(45) Date of Patent: Sep. 2, 2025

(54) REUSABLE SERS MOLECULE DETECTION APPARATUS AND USE METHOD THEREOF

(71) Applicants: QINGDAO UNIVERSITY OF SCIENCE AND TECHNOLOGY, Shandong (CN); UNIVERSITY OF JINAN, Shandong (CN)

(72) Inventors: Lei Wang, Shandong (CN); Xia Wang, Shandong (CN); Qiuling Zhao, Shandong (CN); Maorong Wang, Shandong (CN); Qingyue Zhang, Shandong (CN)

(73) Assignees: QINGDAO UNIVERISTY OF SCIENCE AND TECHNOLOGY, Shandong (CN); UNIVERSITY OF JINAN, Shandong (CN)

( * ) Notice: Subject to any disclaimer, the term of this patent is extended or adjusted under 35 U.S.C. 154(b) by 0 days.

(21) Appl. No.: 18/832,667

(22) PCT Filed: Sep. 5, 2023

(86) PCT No.: PCT/CN2023/116965
§ 371 (c)(1),
(2) Date: Jul. 24, 2024

(87) PCT Pub. No.: WO2024/066955
PCT Pub. Date: Apr. 4, 2024

(65) Prior Publication Data
US 2025/0102439 A1    Mar. 27, 2025

(30) Foreign Application Priority Data
Sep. 27, 2022  (CN) .......................... 202211184945.4

(51) Int. Cl.
*G01N 21/65*    (2006.01)

(52) U.S. Cl.
CPC .................................. *G01N 21/658* (2013.01)

(58) Field of Classification Search
CPC ...................................................... G01N 21/658
See application file for complete search history.

(56) References Cited

U.S. PATENT DOCUMENTS 8,004,685 B2 * 8/2011 Yamamichi .......... G01N 21/554
356/445
8,867,032 B2 * 10/2014 Van Dorpe ............ B82Y 30/00
977/773

(Continued)

FOREIGN PATENT DOCUMENTS

| CN | 107313046 A | 11/2017 |
|---|---|---|
| CN | 109440104 A | 3/2019 |

(Continued)

OTHER PUBLICATIONS

Xu, Tianping, Zhaoxin Geng, and Yue Su. "A potential plasmonic biosensor based asymmetric metal ring cavity with extremely narrow linewidth and high sensitivity." Sensors 21.3 (2021): 752. (Year: 2021).*

(Continued)

*Primary Examiner* — Rufus L Phillips
(74) *Attorney, Agent, or Firm* — Muncy, Geissler, Olds & Lowe, P.C.

(57) ABSTRACT

The reusable SERS molecular test device includes two glass sheets, wherein a noble metal nano film is deposited on the surface of one of the glass sheets to form an SERS substrate, a metal ring is formed by depositing on an edge region of the SERS substrate by means of a coating process, and the metal ring fits with the SERS substrate to form a two-dimensional air chamber; and the other glass sheet, on which molecules under test are adsorbed and immobilized, is placed upside down on the metal ring, the thickness of the layer of the molecules under test being not greater than the thickness of (Continued)

the metal ring. The SERS molecular test device can fundamentally prevent the SERS substrate from being irreversibly contaminated by the molecules under test, so that the SERS substrate can be used in a cleaning-free and reusable manner.

2 Claims, 3 Drawing Sheets

(56) References Cited

U.S. PATENT DOCUMENTS

| | | | | |
|---|---|---|---|---|
| 8,921,789 | B2* | 12/2014 | Pryce | B32B 15/04 |
| | | | | 250/338.1 |
| 10,859,501 | B2* | 12/2020 | Wang | G01N 33/025 |
| 2006/0275541 | A1* | 12/2006 | Weimer | C23C 4/12 |
| | | | | 174/250 |
| 2011/0001976 | A1* | 1/2011 | Minamiguchi | G01N 21/658 |
| | | | | 356/445 |
| 2013/0157254 | A1* | 6/2013 | Sengupta | G01N 33/54373 |
| | | | | 435/7.1 |
| 2013/0330815 | A1* | 12/2013 | Van Duyne | C12Q 1/04 |
| | | | | 435/287.9 |
| 2015/0153283 | A1* | 6/2015 | Huang | B01L 3/50273 |
| | | | | 506/13 |
| 2015/0233831 | A1* | 8/2015 | Ito | G01N 21/658 |
| | | | | 356/244 |
| 2017/0261434 | A1* | 9/2017 | Gwo | G01N 21/658 |
| 2018/0188646 | A1* | 7/2018 | You | G03F 7/039 |
| 2020/0233121 | A1* | 7/2020 | Tseng | G01N 21/658 |

FOREIGN PATENT DOCUMENTS

| | | | |
|---|---|---|---|
| CN | 109470681 A | | 3/2019 |
| CN | 111122543 A | * | 5/2020 |
| CN | 113670890 A | | 11/2021 |
| CN | 115561224 A | | 1/2023 |
| JP | 2011033518 A | | 2/2011 |

OTHER PUBLICATIONS

Simitha, S., et al. "Matrix shaped plasmonic hybrid nanostructure with direction-dependent functionality for multianalyte detection and biosensing." Journal of Physics D: Applied Physics 55.40 (2022): 405403. (Year: 2022).*

Translation of Yang (CN 111122543 A) (Year: 2020).*

* cited by examiner

REUSABLE SERS MOLECULE DETECTION APPARATUS AND USE METHOD THEREOF

TECHNICAL FIELD

The present invention relates to the technical field of spectrum detection, specifically to a reusable SERS molecule detection apparatus and use method thereof.

BACKGROUND TECHNOLOGY

Raman scattering spectroscopy reflects molecule vibration information, by which fingerprint recognition of organic and inorganic molecules such as low-dimensional materials, agricultural chemicals and explosives can be realized, however, the signal strength is usually weak. In 1970s, scholars proved that, coarse surfaces of precious metals have significant reinforcement effects on Raman scattering signals of the absorbed molecules. Since then, Surface Enhanced Raman Scattering (SERS) has become a technique receiving close attention from scientific and industrial circles. At present, it becomes evident that incident optical waves can excite local surface plasma resonance in nanostructures of the precious metals so as to amplify electromagnetic field in the local space for a plurality of orders of magnitude and enhance the Raman signals of the absorbed molecules. The surface having nanostructures and SERS functions is usually called the SERS substrate. In the researches in the past tens of years, precious metals such as gold and silver are the most typical SERS substrate materials. Recently, a variety of nanostructured SERS substrates can be prepared utilizing advanced micro and nano fabrication methods, femtomolar-level molecule detection and single-molecule recognition is made possible.

As a matter of fact, application and commercialization of the SERS substrates still faces many challenges. It is generally recognized that, manufacturing expenses for large-area nano-structured SERS substrates are extremely high. For the detection methods currently available, usually molecules to be detected are to be absorbed on surfaces of the SERS substrates, thereafter, Raman spectrometers are used to directly collect SERS spectra of the molecules to be detected on the surfaces. However, with such detection method, the molecules detected previously will inevitably be left on the surfaces of the SERS substrates, the surfaces of the SERS substrates will be irrevocably polluted, and cannot be repeatedly used, usage cost for the SERS substrates is increased significantly, which hinders severely application thereof. Therefore, it is of important technical values to find a clean free reusable SERS detection method and detection apparatus.

SUMMARY OF INVENTION

To address the technical problems existing in the prior art, the present invention provides a reusable SERS molecule detection apparatus and usage method.

To realize the foregoing technical purpose, the present invention provides the following technical solution: a reusable SERS molecule detection apparatus, comprising two laminar glasses, wherein at least one precious metal nano-film is deposited on a surface of one of the laminar glasses to form a SERS substrate, at least one metal ring is deposited on a marginal surface of the SERS substrate, the at least one metal ring and the SERS substrate form a two-dimensional air cavity; another of the laminar glasses is closed over the at least one metal ring after absorbing and fixing molecules to be detected thereon, and a thickness of the molecules to be detected does not exceed a thickness of the at least one metal ring, so as to reserve an air gap in between a layer of the molecules and the SERS substrate.

As a preferred technical solution of the present invention, the SERS substrate comprises a functional surface based on (surface plasmon) electromagnetic physical reinforcement, and a surface structure of the SERS substrate comprises a coarse surface, at least one micro-nano tip and at least one micro-nano slit.

As a preferred technical solution of the present invention, a surface of the SERS substrate comprises sub-10 nm gold and/or silver nanostructures.

As a preferred technical solution of the present invention, a role of the at least one metal ring is to serve as a marginal physical isolation layer, and build the two-dimensional air cavity of a nano-level thickness in a central area. The thickness of the at least one metal ring comprises a thickness of the two-dimensional air cavity, and the thickness is dictated precisely by coating processes of the at least one metal ring, wherein the thickness of the at least one metal ring is preferably 1-5 nm.

As a preferred technical solution of the present invention, the coating processes of the at least one metal ring comprise e-beam evaporation, magnetron sputtering and thermal evaporation deposition.

As a preferred technical solution of the present invention, materials of the at least one metal ring do not affect functions of the SERS substrate, and the at least one metal ring may comprise elementary metals or alloys, or oxidants or inorganic non-metal such as silicon dioxide and silicon, and preferably chemically and structurally stable materials.

As a preferred technical solution of the present invention, the at least one metal ring comprises an annular structure with a uniform thickness and can be rectangular or circular.

As a preferred technical solution of the present invention, actions of the laminar glass carrying the molecules to be detected are to absorb the molecules to be detected, and control a size of a gap between the molecules to be detected and the SERS substrate. The laminar glass shall have a high transmission, so as to radiate light excited by the Raman spectrometer to the molecules to be detected without any attenuation, therefore, materials of the laminar glass are preferably quartz glasses, silicate glasses etc.; a thickness thereof shall be controlled in between 0.1 mm to 1 mm to promise good light admissibility and rigidity.

In the present invention, for the entire apparatus, requirements are only placed on a longitudinal dimension and no requirement is on a transverse dimension of the SERS substrate. In other words, the technique is applicable for use in micro or millimeter level SERS substrates, and also applicable for use in large area SERS substrates in centimeter or above. One of key reasons behind is the laminar glasses usually have good rigidity and can promise the thickness of the two-dimensional air cavity is even along a planar direction.

Compared with the prior art, the present invention has the following beneficial effects:

With the detection apparatus proposed in the present invention, irrevocable pollution of the molecules to be detected on the SERS substrates is avoided, clean free reuse of the SERS substrates is realized, usage expenses are reduced to a great extent, and an innovative technique is provided for utilization of the SERS substrates.

The present invention further provides a molecule detection method based on SERS, using the reusable SERS molecule detection apparatus as mentioned above, and the method comprises the following steps:

Step 1: taking a laminar glass, depositing a layer of coarse precious metal nano-film on a surface of the laminar glass and forming an SERS substrate;

Step 2: depositing a metal ring of a predetermined thickness at a marginal area of the precious metal nano-film with a shield;

Step 3: attaching molecules to be detected on a surface of another laminar glass, closing the laminar glass over the metal ring so to have the molecules to be detected in a two-dimensional air cavity, and promise that the molecules to be detected will not contact a surface of the precious metal nano-film;

Step 4: injecting light excited by a Raman spectrometer, and a molecule SERS spectrum based on local electromagnetic reinforcement is obtained; and Step 5: replacing the laminar glass carrying solution of the molecules to be detected, and repeating steps 3-4 until all the molecules to be detected have been detected.

The molecules to be detected shall be attached closely on a surface of the laminar glass, a thickness of the molecules to be detected shall not exceed a thickness of the metal ring so as to reserve an air gap in between the molecules to be detected and the SERS substrate. To this end, in the step 3, to attach the molecules solution evaporation is preferably used, that is, to prepare a solution containing molecules to be detected of a low concentration and drip on a surface of the laminar glass, after evaporation of the solution, a very thin layer of the molecules to be detected will be obtained, and the thickness of the molecules to be detected shall be maintained in between 0.1 nm to 4 nm.

Compared with the prior art, the present invention has the following beneficial effects:

With the detection method proposed in the present invention, no additional requirement has been posed on configuration of the Raman spectrometer and parameters such as excitation wavelength, excitation time, and excitation light power, the operation is simple, existing SERS substrate is compatible, universality of the method is good, and application prospect thereof is wide.

BRIEF DESCRIPTION OF DRAWINGS

Drawings are employed to provide further understanding on the present invention and form a part of the specification, serve to explain the present invention together with embodiments 1 of the present invention, and do not form any limitation on the present invention, in the drawings.

Figure 1:
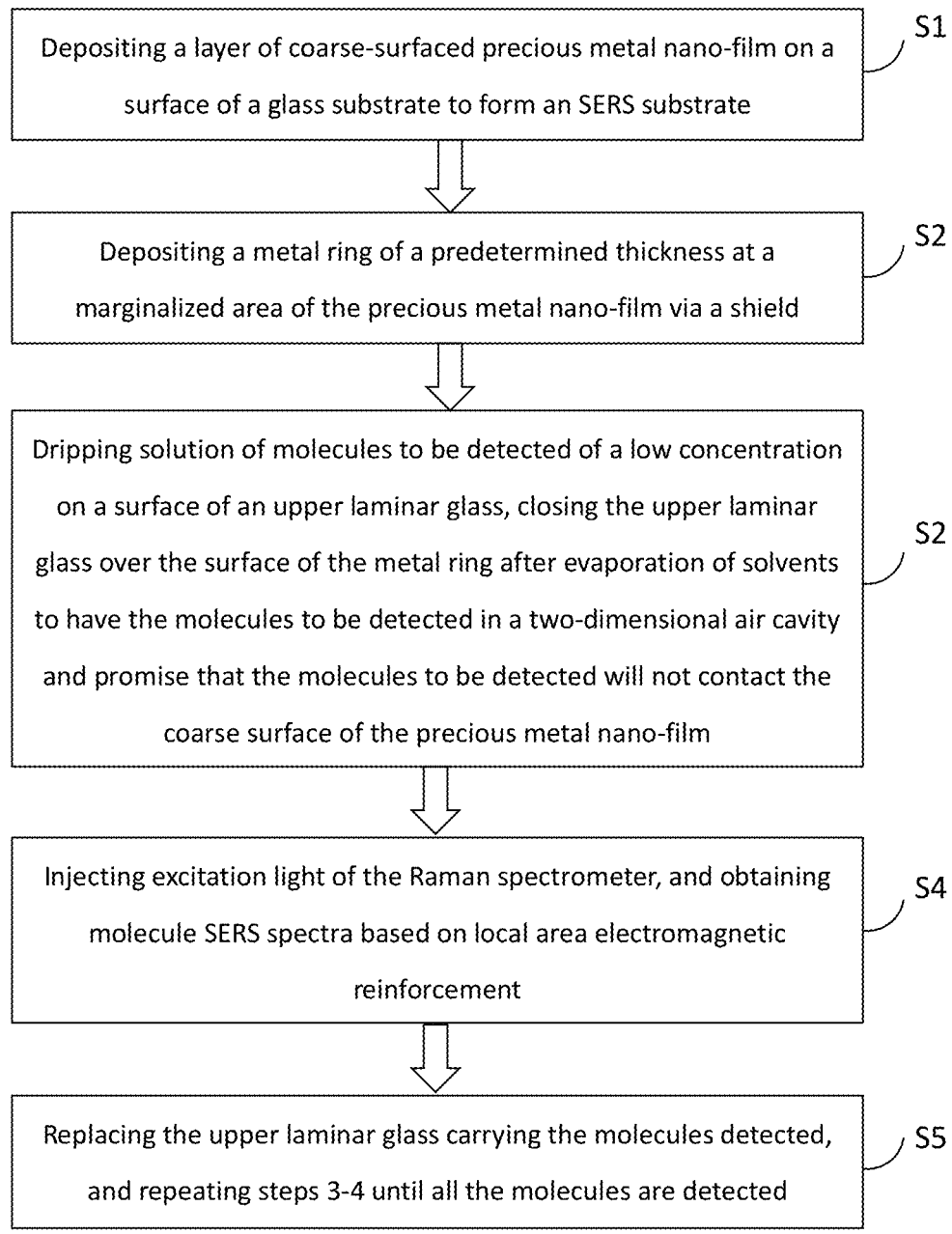
FIG. 1 is an operation flowchart diagram showing a molecule detection method based on SERS provided in an embodiment of the present invention.

Wherein 1 SERS substrate; 2 metal ring; 3 upper laminar glass; 4 molecule to be detected; 5 Raman excitation light; and 6 two-dimensional air cavity.

EMBODIMENTS

Hereinafter a clear and complete description of technical solutions of the present invention in embodiments of the present invention shall be given in conjunction with drawings of the embodiments of the present invention; apparently, the embodiments given here are only some embodiments of the present invention rather than all. Usually components of the embodiments of the present invention described and shown in the drawings can be configured and designed in a plurality of different configurations. Therefore, the following detailed description on the embodiments of the present invention aims not to limit the protection scope of the present invention and show only preferred embodiments of the present invention. Based on the embodiments of the present invention, all other embodiments obtained by skilled in the art without paying creative effort shall fall into the protection scope of the present invention.

Figure 2:
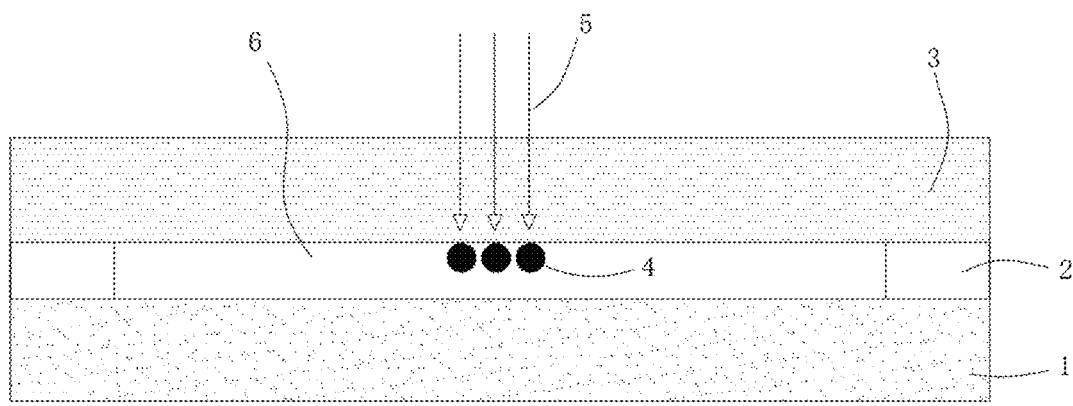
FIG. 2 is a schematic diagram (a side view) showing a reusable SERS molecule detection apparatus as provided in an embodiment of the present invention.

The present invention provides a reusable SERS molecule detection apparatus, and entire structures thereof are shown in FIG. 2, the apparatus comprises a glass substrate and an upper laminar glass 3, wherein, a layer of precious metal nano-film is deposited on a surface of the glass substrate to form an SERS substrate 1, a metal ring 2 is formed at a marginal area of the SERS substrate 1 by coating processes, and the metal ring 2 and the SERS substrate 1 form a two-dimensional air cavity 6. The upper laminar glass 3 is closed over the metal ring 2 after absorbing and fixing molecules to be detected 4.

Wherein the SERS substrate comprises a functional surface based on (surface plasmon) electromagnetic physical reinforcement, and a surface structure of the SERS substrate 1 comprises but is not limited to a coarse surface, a micro-nano tip and a micro-nano slit. Preferably, the SERS substrate 1 comprises a gold and silver nano-structure with a characteristic size in sub-10 nm. A thickness of the metal ring 2 is controlled precisely by deposition technologies, and the thickness is maintained in between 1-5 nm. The deposition technologies can be e-beam evaporation, magnetron sputtering and thermal evaporation deposition. The upper laminar glass 3 comprises quartz glasses or silicate glasses, a thickness thereof shall be maintained to be 0.1 mm to 1 mm to promise good light admissibility and rigidity.

A detection method proposed in the present invention is as shown in FIG. 1, comprising: (1) depositing a layer of coarse-surfaced precious metal nano-film on a surface of the glass substrate to form the SERS substrate 1; (2) depositing the metal ring 2 of a predetermined thickness at a marginal area of the precious metal nano-film with a shield; (3) dripping the molecules to be detected of a low concentration to a surface of the upper laminar glass 3, after evaporation of solvents, closing the upper laminar glass 3 attached with the molecules to be detected 4 over the surface of the metal ring 2, so as to have the molecules to be measured in a two-dimensional air cavity 6, and promise that the molecules to be detected 6 do not contact the coarse precious metal nano-film surface; (4) emitting excitation light from a Raman spectrometer, and obtaining molecule SERS spectrograph based on local area electromagnetic reinforcement; and (5) replacing the upper laminar glass 3 carrying solution of the molecules to be detected and repeating steps 3-4 until all the molecules to be detected have been detected.

Figure 3:
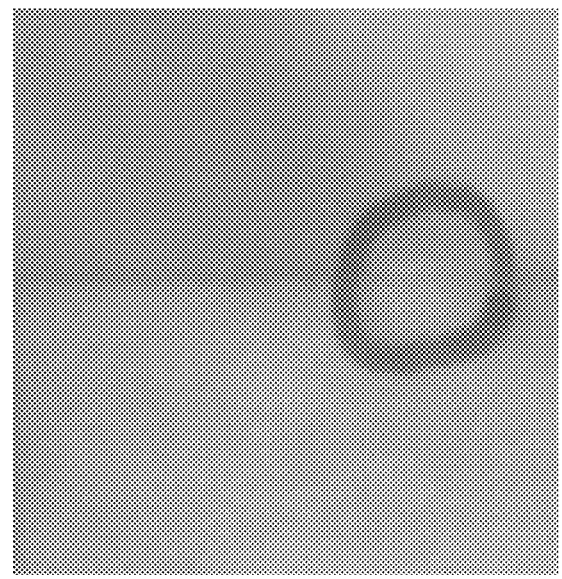
FIG. 3 is a photograph of an SERS substrate provided in the embodiment 1 of the present invention, a gold nano-film sputtered on an upper portion of the photograph, and no gold nano-film is in a lower portion of the photograph.
Figure 4:
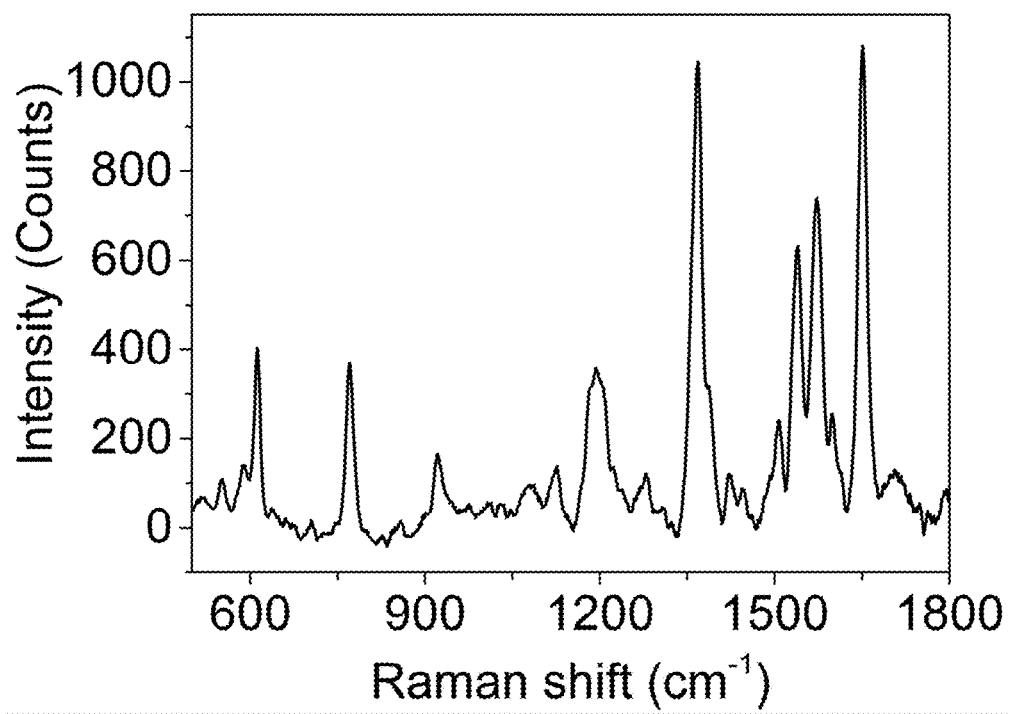
FIG. 4 is a one-point SERS spectrum of R6g molecules as provided in the embodiment 1 of the present invention.

The following is a typical non-inclusive embodiment of the present invention: Embodiment 1:

The present embodiment provides a molecule detection method based on SERS, and by comparison with an empty substrate, effectiveness of the detection method proposed in the present invention has been certified, specifically the method comprising:

1) Preparing a glass substrate with a thickness of 0.17 mm and a transverse dimension of 2 cm×2 cm, washing with alcohol, acetone and deionized water, depositing a layer of gold nano-film of a thickness of 5 nm on a half of an area of a surface of the glass substrate via ion sputtering methods, the surface of the glass substrate is coarse with SERS reinforcement functions. Another half of the surface of the glass substrate is a control group with no SERS reinforcement functions. Areas of the gold nano-film and the blank glass control group are approximately equal, and a division line is a straight line.
2) Depositing a layer of square metal ring at a marginal area of the glass substrate in 1) via ion sputtering methods and using a shield.
3) Washing another transparent thin glass with a thickness of 0.17 mm and a transverse dimension of 2 cm×2 cm as an upper laminar glass 3, dripping rhodamine (R6g) aqueous solution with a concentration of $10^{-8}$ Mol/L at a true center of the glass via a drip tube, standing in a clean room and drying naturally. Closing the upper laminar glass 3 attained with R6g molecules over the rectangular metal ring, closing tightly and having the R6g molecules face the gold nano-film (the SERS substrate 1) underneath. The R6g molecules are evenly distributed in an area as shown in the photograph in FIG. 3. Black circles in FIG. 3 show signal collection areas for subsequent Raman mapping.
4) Collecting fingerprint spectra of the R6g molecules by the Raman spectrometer. First of all, acquiring Raman spectra of the R6g molecules at any point in the gold nano-film area, certifying that the R6g molecules are attached on surfaces of the samples, as shown in FIG. 4. Conducting Raman spectroscopy mapping detection, and the spectroscopy collection area comprises a rectangle of 80 μm×80 μm and crosses a division line between the gold nano-particle and the blank glass, so as to compare the Raman spectroscopy signal strengths. A wavelength of the excitation light for spectrum detection is 633 nm, and excitation power is 3.4 mW, integration time is 5 s, and a multiplying factor of a focusing lens is 50×.

In the present embodiment, a complete Raman spectrum of the R6g molecules is given in FIG. 4, wherein a characteristic peak is apparent, showing that the R6g molecules are attached to the samples, and a basis is laid for subsequent mapping data acquisition.

Figure 5:
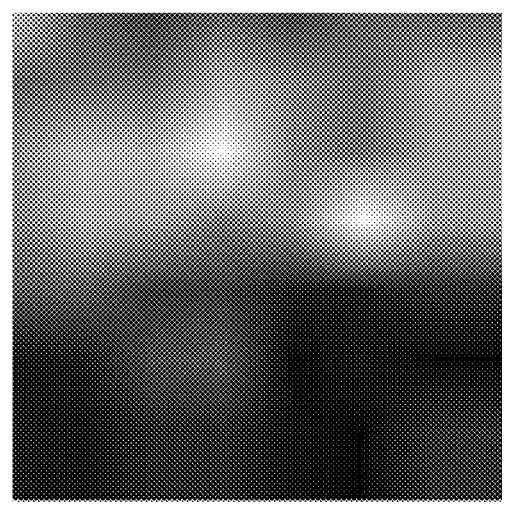
FIG. 5 shows Raman spectrographic mapping data of the R6g molecules as provided in the embodiment 1 of the present invention.

In the present embodiment, FIG. 5 shows Raman mapping data of the R6g molecules at an intersection between the gold nano-film and the blank glass. Apparently, the signal strength in an upper portion (gold nano-film) is obviously bigger than the signal strength in a lower portion (the empty glass). This establishes that although the R6g molecules attached on the thin glass does not contact directly the gold nano-film (the SERS substrate 1), the gold nano-film exhibits strong SERS reinforcement compared with the blank control group. During detection, the R6g molecules do not pollute the SERS substrate 1.

In view of the foregoing embodiment, it is evident that, the SERS molecule detection apparatus proposed in the present invention can play the Raman signal reinforcement function of the SERS substrate, and avoid pollution of the molecules to be detected on the SERS substrate efficiently, further, the operation flow processes are quick and convenient, and usage expenses of the SERS substrate is greatly reduced. The present invention provides an innovative technique for utilization and commercialization of the SERS substrate.

The applicant clarifies that, the foregoing embodiment is employed to explain a detailed method of the present invention, however, the present invention is not limited to the foregoing detailed method, that is, the present invention does not rely on the foregoing detailed method for implementation. Those skilled in the art shall understand that, any improvement to the present invention, equivalent replacement to materials of the present invention, addition of auxiliary elements and selection of specific conditions and manners shall fall into the protection scope of the present invention.

The invention claimed is:

1. A molecule detection method based on SERS, using a reusable SERS molecule detection apparatus comprising:
   two laminar glasses, at least one precious metal nano-film, at least one metal ring and molecules, wherein
   the at least one precious metal nano-film is deposited on a surface of one of the laminar glasses to form a SERS substrate,
   the at least one metal ring is deposited on a marginal surface of the SERS substrate, the at least one metal ring and the SERS substrate form a two-dimensional air cavity; and the at least one metal ring comprises an annular structure with a uniform thickness and is rectangular or circular; another of the laminar glasses is closed over the at least one metal ring after absorbing and fixing the molecules to be detected thereon, and
   a thickness of the molecules to be detected does not exceed a thickness of the at least one metal ring, so as to reserve an air gap in between a layer of the molecules and the SERS substrate; wherein a thickness of the at least one metal ring is greater than thicknesses of typical molecules and the at least one metal ring comprises an annular structure with a uniform thickness and is rectangular or circular, and the method comprises the following steps:
   Step 1: taking a laminar glass, depositing a layer of coarse precious metal nano-film on a surface of the laminar glass and forming an SERS substrate;
   Step 2: depositing a metal ring of a predetermined thickness at a marginal area of the precious metal nano-film with a shield;
   Step 3: attaching molecules to be detected on a surface of another laminar glass, closing the laminar glass over the metal ring so to have the molecules to be detected in a two-dimensional air cavity, and promise that the molecules to be detected will not contact a surface of the precious metal nano-film;
   Step 4: injecting light excited by a Raman spectrometer, and a molecule SERS spectrum based on local electromagnetic reinforcement is obtained; and
   Step 5: replacing the laminar glass carrying solution of the molecules to be detected, and repeating steps 3-4 until all the molecules to be detected have been detected.

2. The molecule detection method based on SERS of claim 1, wherein in the step 3, to attach the molecules solution evaporation is used, and the thickness of the molecules to be detected is maintained in between 0.1 nm to 4 nm after evaporation of solvent.

* * * * *